(12) United States Patent
Whalen

(10) Patent No.: US 6,243,836 B1
(45) Date of Patent: Jun. 5, 2001

(54) APPARATUS AND METHOD FOR CIRCULAR BUFFERING ON AN ON-CHIP DISCONTINUITY TRACE

(75) Inventor: Shaun Patrick Whalen, Wescosville, PA (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/135,008

(22) Filed: Aug. 17, 1998

(51) Int. Cl.[7] .................................................. G06F 11/00
(52) U.S. Cl. ................................ 714/45; 714/39
(58) Field of Search .................... 714/25, 45, 6, 714/1, 39, 38; 713/400, 323; 712/227; 709/233, 224

(56) References Cited

U.S. PATENT DOCUMENTS

| | | | |
|---|---|---|---|
| 5,615,357 | 3/1997 | Ball | 703/21 |
| 5,724,505 | 3/1998 | Argade et al. | 714/45 |
| 5,771,356 | * 6/1998 | Leger et al. | 709/233 |
| 6,041,406 | * 3/2000 | Mann | 712/227 |
| 6,081,903 | * 6/2000 | Vorbach et al. | 713/400 |
| 6,094,729 | * 7/2000 | Mann | 714/25 |

* cited by examiner

Primary Examiner—Meng-Al T. An
Assistant Examiner—Jungwon Chang
(74) Attorney, Agent, or Firm—Dickstein Shapiro Morin & Oshinsky LLP

(57) ABSTRACT

The present invention is embodied in a method and apparatus for generating a complete discontinuity trace of instruction execution by a digital processor utilizing a serial interface, such as a JTAG, that provides "trace until" capability by utilizing circular buffering of an on-chip discontinuity trace. The serial bit stream is observed as it is clocked out of the processor pins and trace codes are extracted and written to a local memory. Codes that have a complete address are arranged into a linked list, and the link information is used to maintain a circular buffer when the buffer fills up and the oldest data is overwritten with new data.

8 Claims, 6 Drawing Sheets

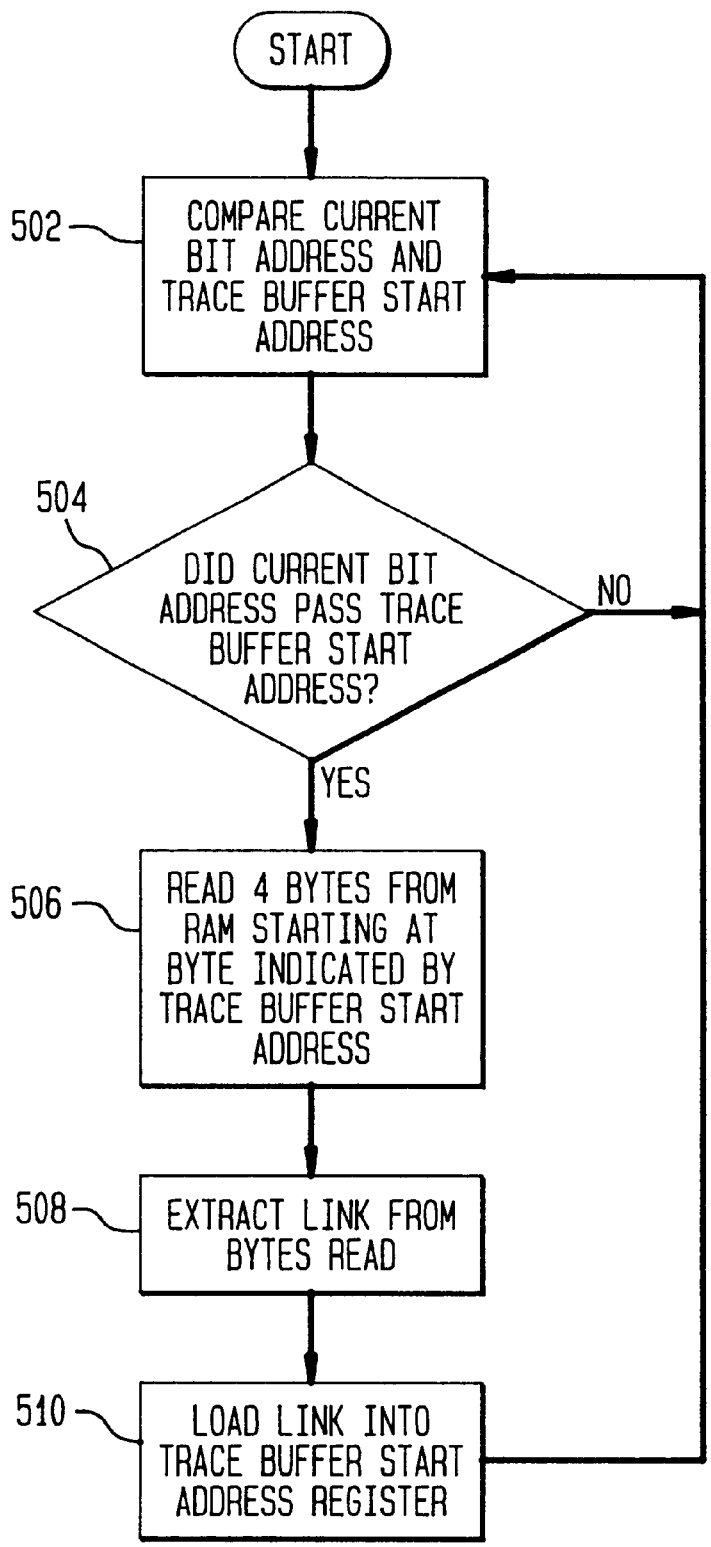

APPARATUS AND METHOD FOR CIRCULAR BUFFERING ON AN ON-CHIP DISCONTINUITY TRACE

BACKGROUND OF THE INVENTION

1. Field of the Invention

The present invention relates generally to digital processor devices, and more particularly to a digital processor capable of on-chip real-time non-invasive tracing of the execution of program instructions utilizing a circular buffer.

2. Description of the Related Art

One of the most essential debugging tools used by programmers and software engineers is a program trace which is representative of the stream of instructions executed by a digital processor. By examining the instruction stream that was executed, a user (e.g., a programmer or a software engineer) may determine if the application hardware and software are performing properly. For example, if unintended behavior of the hardware or software is detected, the user may determine what caused the behavior.

The application area addressed by the present invention is that of integrated circuits incorporating digital processors used in embedded systems. An embedded system is one in which the processor does not have the usual interfaces present when developing the software which runs on the system. Frequently, these systems are not general purpose and perform a fixed function. Some typical examples of embedded systems are cellular telephones, printers and disk drives. Unlike a desktop system, such as a personal computer, these systems do not have a keyboard and display to be used to debug and verify the interaction of the software and the hardware. Furthermore, the marketplace for these products frequently demands that they be physically small in size, thin, and lightweight. These demands force the use of small, thin, and fine-pitch integrated circuit packages mounted on densely populated printed circuit boards. Fine-pitch circuits have closely spaced package pins, and, as a result of the small package size, only those pins that are essential to the system's function are present (i.e., a normal pin-out chip). Extra pins which would facilitate the debugging process and, in particular, permit collection of a program trace, are not typically provided on such packages. A package that does provide such extra pins is commonly referred to as a bond-out chip.

A program trace is most commonly obtained by connecting a logic analyzer device to a normal pin-out chip or a special bond-out chip that is connected to the digital processor being debugged. A logic analyzer device may be a logic analyzer or an in-circuit emulator, both of which are well known in the art. The logic analyzer typically records a trace of the signals observable on the pins of either the normal pin-out chip or the bond-out pin-out chip. A typical scenario using a logic analyzer as a debugging tool for a target system would be as follows. The target system processor encounters some error in its operation, such as for example dereferencing a null pointer, and halts its operation. The developer desires to construct a program trace up to the halt of execution of the processor to determine the cause of the problem. The developer will set a trace trigger on the offending memory address, that is, the address where execution halted. The developer will then configure a logic analyzer to collect a program trace until the trigger on the offending memory address fires. The logic analyzer will record the processor cycles in a buffer until the trigger fires. When the trigger has fired and execution has halted, the developer will read out the contents of the logic analyzer's buffer and examine the processor's instruction execution, working backwards from the instruction that performed the offending memory access until the instruction that set the pointer to null is encountered.

In this scenario, the logic analyzer collects the trace in a circular buffer. A circular buffer is a buffer that, once filled, overwrites the oldest entries to record new data. In general, it may be necessary to run the target system for an arbitrary length of time before the error occurs and the trigger fires. This period may be long enough to completely fill the logic analyzer's buffer. Therefore, a circular buffer is used to record the bus cycles so that the developer has a record of bus cycles for some time period before the error occurred. The circular buffer gives the developer the ability to "trace until" the event of interest occurs and then analyze the history of the behavior that led to the event.

However, this approach has several limitations in the area of embedded systems. First, as noted, it is difficult to reliably connect a logic analyzer device to the pins of the thin, fine-pitch packages of densely populated circuit boards commonly used in embedded systems (such as cellular telephones). Second, a logic analyzer device cannot be connected at all unless board space around the chip to be monitored is left empty to accommodate the logic analyzer connector. This requirement directly increases the size of the embedded system. Furthermore, the logic analyzer device can monitor only those signals that are available at the package pins of the chip to be monitored. Frequently, the signals required for a program trace are not available at the package pins of a normal pin-out chip. Thus, collecting a program trace would require either operating the system in a mode which forces internal signals to the package pins, thus sacrificing the system timing, or the use of a bond-out pin-out chip in the embedded system, thus sacrificing small size.

In an effort to overcome the problems associated with using a logic analyzer with an embedded system, several approaches have been developed. One approach, described in commonly assigned U.S. Pat. No. 5,724,505 to Argade et al., which is herein incorporated by reference, provides a compressed program trace by on-chip hardware of a digital processor to an external debug host computer. The compressed trace contains the minimum information necessary for a user to reconstruct a full program trace with reference to the program image corresponding to the trace that was collected.

Trace recording hardware is provided on-chip but external to the processor core of a digital processor having a serial port, such as a Joint Test Access Group (JTAG) port. The JTAG port is a standard port used for testing integrated circuits. This standard has been adopted by the Institute of Electrical and Electronics Engineers, Inc., as is now defined as the IEEE Standard 1149.1, IEEE Standard Test Access Port and Boundary-Scan Architecture, which is incorporated herein by reference. The use of a JTAG port is advantageous because no special bond-out chip or logic analyzer is required. The trace recording hardware receives, via an instruction type line as described below, data indicative of instruction types executed by the processor core and also receives, via an inter-module bus, data indicative of program addresses corresponding to the instruction types received via the instruction type bus. The trace recording hardware includes an address first-in-first-out (FIFO) buffer for storing addresses received by the trace recording hardware, and an instruction type FIFO buffer for storing instruction types received by the trace recording hardware.

The trace recording hardware also includes a trace buffer control capable of identifying at least three pre-defined instruction types, preferably including discontinuity and conditionally executed instructions. Certain program instructions are called discontinuities because their execution requires the processor to discontinue the program's normal sequential instruction stream and direct the program's execution to a different, non-sequential address. These discontinuities include jumps, calls, and events such as hardware interrupts. Conditionally executed instructions include instructions such as "MOV.IFT," i.e., move if true.

Each of the at least three pre-defined instruction types has an associated coding scheme for its corresponding address information. The trace buffer control analyzes the stream of instruction types and corresponding addresses received from the processor core and applies a coding scheme for address information of when a particular instruction type is identified as one of the at least three pre-defined instruction types. Additionally, for conditionally executed instructions, the instruction type indicates whether a particular instruction was actually executed by the processor core. The trace recording hardware then stores the instruction type in the instruction type FIFO, and stores its associated address in the address FIFO. The contents of the FIFOs, which are representative of a compressed program trace, are then shifted out through the serial port. The full program trace may then be reconstructed by the user with reference to the program image.

Thus, a user is able to obtain a continuous compressed program trace in real-time via a digital processor's serial port, such as a JTAG port, without requiring either external tracing hardware, such as a logic analyzer, or having to halt the execution of the program.

However, problems still remain with debugging tools using this approach. Although the use of the JTAG trace advantageously eliminates the need to connect a logic analyzer, it does not provide the "trace until" capability of a logic analyzer. Instead, it provides only a "trace from" capability, i.e., a trace can be collected only for a finite duration from a specified starting point. Therefore, a debug user cannot currently use a JTAG trace to collect information until some event of interest occurs. The debug user must attempt to start the JTAG trace close to the event of interest so that the event is collected before the JTAG trace reaches the end of its buffer. If the JTAG trace is not started close enough to the event of interest, the buffer will fill before the event of interest occurs. Thus, there exists the need for a device which uses a JTAG trace while providing a "trace until" capability.

SUMMARY OF THE INVENTION

The present invention overcomes the problems associated with the prior art and provides a unique method and apparatus for circular buffering of an on-chip discontinuity trace, resulting in a debugging tool utilizing a JTAG trace with a "trace until" capability.

In accordance with the present invention, "trace until" capability is provided by circular buffering a JTAG bit stream consisting of a compressed program trace.

The "trace until" capability is used as follows. A trace trigger is set by the developer on the memory address that causes the processor to halt, i.e., the "offending" memory address. The on-chip trace logic is configured to transmit the compressed trace over the JTAG pins. The serial (JTAG) bit stream is observed as it is clocked out of the processor pins, the trace codes transformed by a circular buffer controller, and the transformed trace codes are written to a local memory, i.e., a trace buffer memory. The trace codes that have addresses are arranged into a linked list. If the trace buffer memory fills before the trigger set by the developer fires, the hardware uses the link information to maintain the trace buffer memory as a circular buffer, and overwrite the oldest data with new data. As new data overwrites old data, the start of the trace buffer memory is always maintained at a trace code with an address. Thus, the most recent trace codes will continue to be stored in the trace buffer memory until the trigger fires. When the trigger fires, the trace collection halts and the developer can extract the contents of the trace buffer memory to examine the processor's instruction execution which led to the firing of the trigger. Since the start location in the trace buffer memory will contain a trace code with an address, there is a defined reference point at which to begin reconstruction based on the program image to reconstruct the complete program trace to debug the system.

These and other advantages and features of the invention will become apparent from the following detailed description of the invention which is provided in connection with the accompanying drawings.

BRIEF DESCRIPTION OF THE DRAWINGS

FIG. 5 illustrates in flow chart form the method for wrapping the trace buffer memory.

DETAILED DESCRIPTION OF THE PREFERRED EMBODIMENTS

The present invention will be described as set forth in the preferred embodiments illustrated in FIGS. 1–5. Other embodiments may be utilized and structural or logical changes may be made without departing from the spirit or scope of the present invention.

Figure 1:
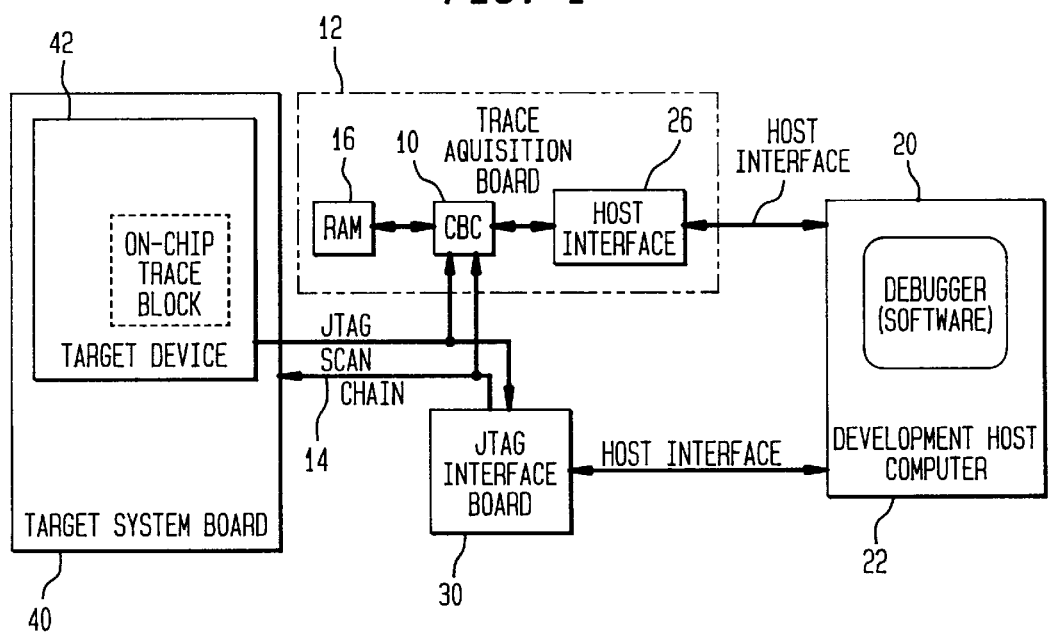
FIG. 1 illustrates in block diagram form a system configuration in accordance with the present invention.

FIG. 1 illustrates in block diagram form a system configuration in accordance with the present invention. The present invention can be implemented as a stand-alone device that monitors the JTAG bit stream, or alternatively, the device according to the present invention can be integrated as part of the on-chip debug logic of a digital signal processor device or the like. Thus, a circular buffer controller (CBC) 10 may reside on a trace acquisition board 12 that passively monitors the JTAG scan chain 14. The CBC 10 monitors the bit stream traveling over the JTAG scan chain 14 so that it can extract and record trace information in its on-board RAM 16. The user controls and retrieves the trace information through the software debugger 20 on the development host computer 22. The CBC driver in the debugger software communicates with the CBC 10 through the host interface 26 of the trace acquisition board 12. JTAG interface board 30 manages JTAG protocol over the JTAG scan chain 14.

Alternatively, the host interface may be through the JTAG scan chain. In this case, a separate host interface 26 to the development host computer 22 is unnecessary. If the CBC 10 is controlled through JTAG interface board 30, then the debugger 20 JTAG driver software includes code to manage the CBC 10 as well as the other devices on the JTAG scan chain.

Target system board 40 includes a target device 42. Target device 42 is a device that includes an integrated circuit that incorporates a digital processor used in an embedded system. Target device 42 may be a microcontroller (MCU), digital signal processor (DSP), an application specific integrated circuit (ASIC) or the like. Target device 42 outputs a serial bit stream on the JTAG scan chain 14. The serial bit stream is carried by JTAG scan chain 14 and input to CBC 10. The trace codes in the JTAG bit stream input to CBC 10 may consist of the following codes as are known in the art:

Taken Discontinuity—indicates that the processor executed a conditional discontinuity or instruction that was executed.

Not Taken Discontinuity—indicates that the processor executed a conditional discontinuity or instruction that was not executed.

Register Indirect Discontinuity—indicates that the processor executed a jump whose target was dynamically computed; the target address of the jump is included with this code.

Event Discontinuity—indicates that the processor encountered an interrupt, trap, or exception and vectored to an event handler for that event; the event vector is included with this code along with the address at which execution was interrupted.

Overrun—indicates that the processor's on-chip trace buffer became full when recording trace information.

Debug State Entered—indicates that the processor entered the debug state.

Empty—indicates that the on-chip trace buffer is currently empty.

Figure 2:
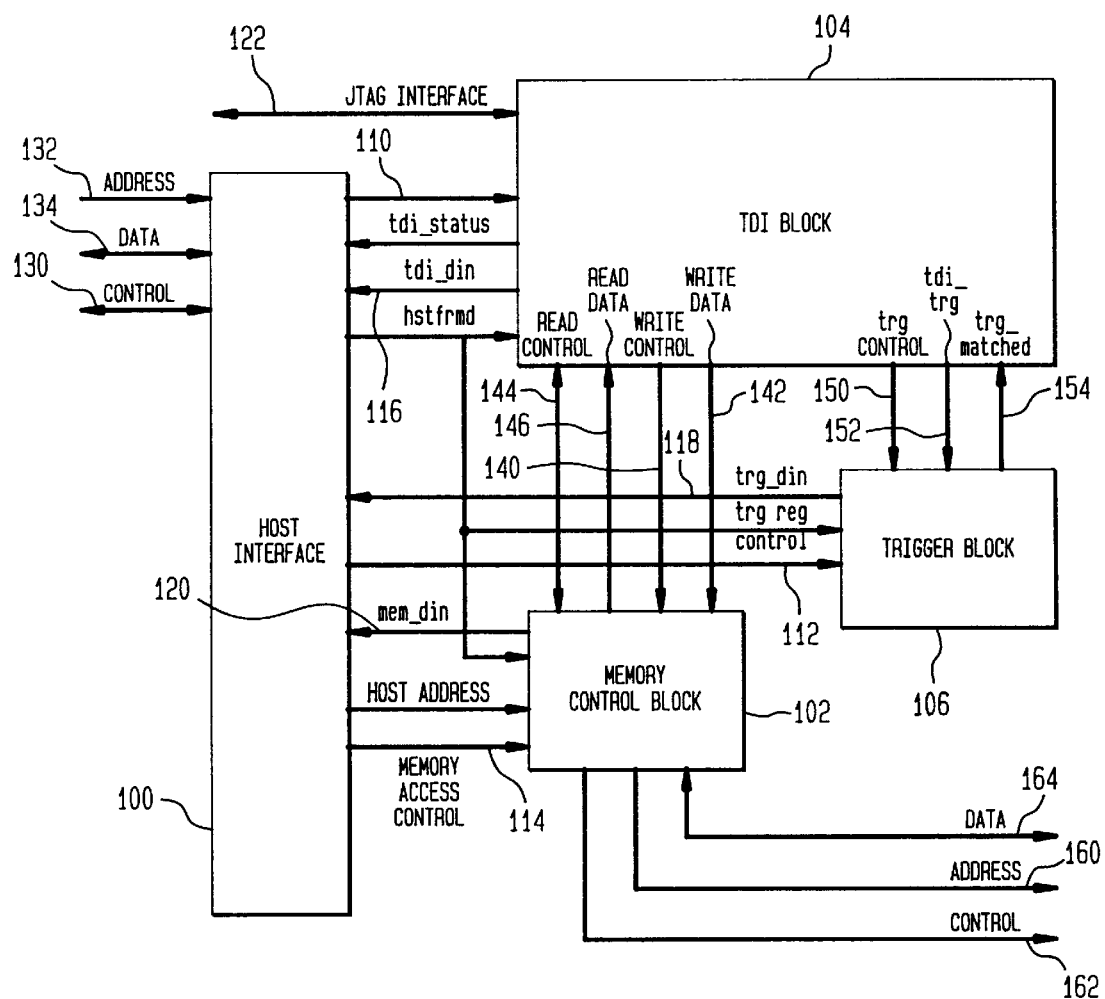
FIG. 2 illustrates in block diagram form the overall structure of the circular buffer controller.

FIG. 2. illustrates in block diagram form the overall structure of the CBC 10 of FIG. 1. The CBC 10 consists of four major blocks, the host interface 100, the memory control block 102, the tdi block 104 and the trigger block 106. Tdi block 104, memory control block 102, and trigger block 106 implement the operational features of the circular buffer controller.

Host interface block 100 enables configuration and status access to the CBC registers and also enables the connection between the development host computer 22 and the internal registers of CBC 10. This block implements read and write of internal registers according to the timing required by the bus protocol. In addition, this block enables access to the RAM 16 that implements the trace buffer. The software debugger 20 can read and write RAM 16 through host interface block 100. A host bus transaction such as a read or write is activated by the signals of the host bus control 130. The register or memory location being accessed is indicated by the host bus address 132. The data (if a write) is on the host bus data signal 134. Host interface block 100 activates the tdi reg control 110 or trg reg control 112 to read or write registers in the respective blocks; or activates the memory access control 114 and passes the host bus address to the host address to perform RAM reads and writes. On a read the blocks return data on the tdi_din 116, trg_din 118, or mem_din 120 signals to the host interface block 100.

Tdi block 104 parses the JTAG bit stream and cooperates with memory control block 102 and trigger block 106 to implement the circular buffering of the trace. Tdi block 104 interfaces to the JTAG pins via the JTAG interface signals 122. Tdi block 104 contains a shifter datapath and state machine control to detect the different trace codes in the bit stream. When a number of complete bytes of trace information have been accumulated, tdi block 104 requests via memory write control 140 a write via memory write data 142 to the RAM 16 via the memory control block 102. When the circular buffer wraps around to the beginning, the tdi block 104 requests via memory read control 144 a read via memory read data 146 from the RAM 16 via the memory control block 102.

Trigger block 106 detects the occurrence of specified addresses in the trace bit stream. Tdi block 104 parses the bit stream and indicates to the trigger block 106 via trg control 150 when to capture the serial bits on the tdi signal 152 (tdi_trg). If the trigger block 106 detects a match between its programmed target address register and an address in the bit stream, it indicates this to the tdi block 104 over the trg_matched signal 154.

Memory control block 102 implements reads and writes to the RAM 16, either from the host interface 100 or from the tdi block 104. Memory control block 102 interfaces to the RAM 16 over the sram address 160, sram control 162, and sram data 164 signals. Memory control block 102 performs the memory access according to the timing of the requesting block (either host interface 100 or tdi block 104).

Figure 3:
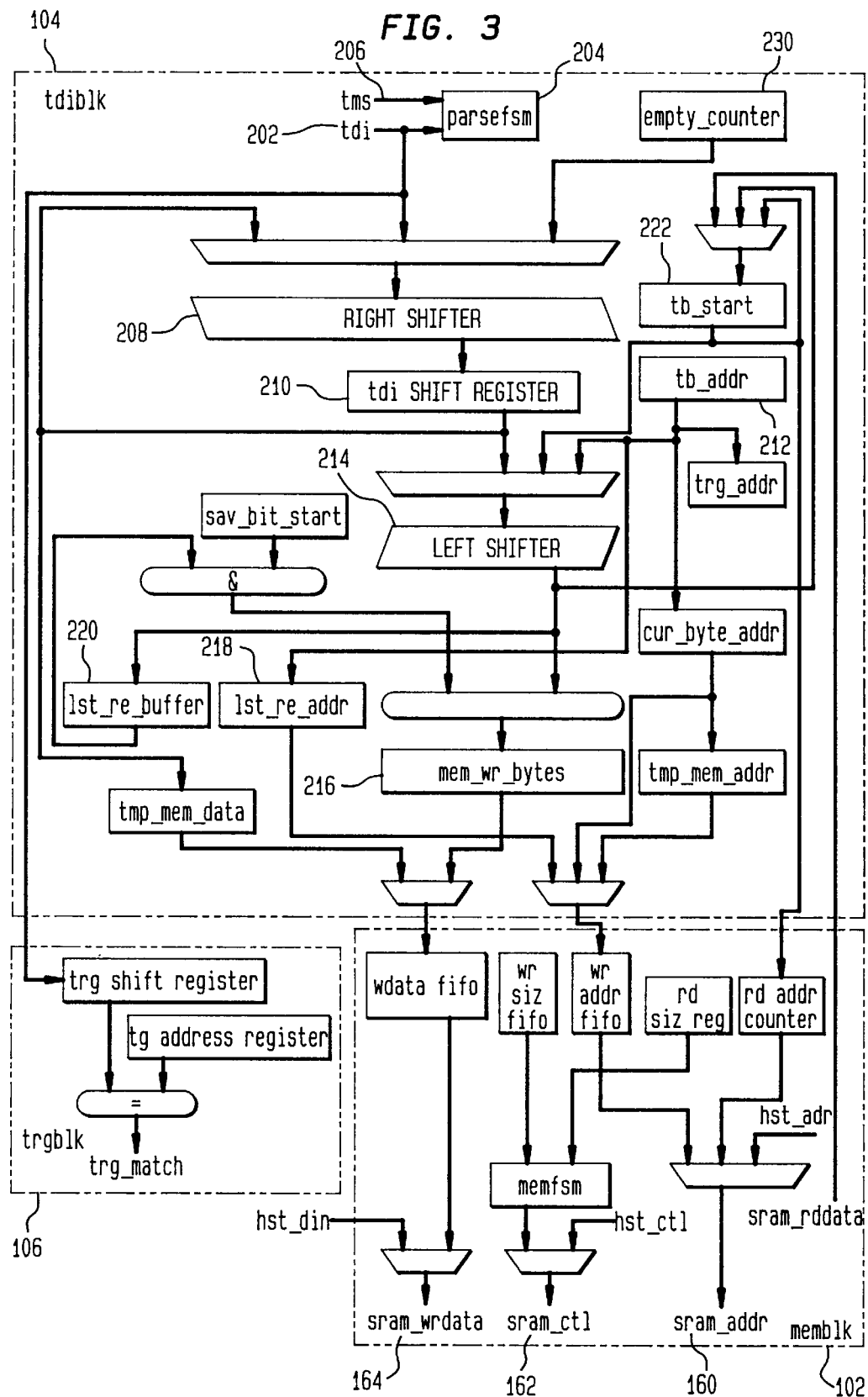
FIG. 3 illustrates in block diagram form the three blocks that perform the circular buffering function.

FIG. 3 shows more details of the blocks of CBC 10. This figure shows the interactions of the three blocks that perform the circular buffering function, the tdi block 104 (hereinafter referred to as tdiblk), the memory control block 102 (hereinafter referred to as memblk), and the trigger block 106 (hereinafter referred to as trgblk). The tdiblk 104 performs the function of accumulating the serial bit stream that appears on tdi 202 into bytes and writing these into the RAM 16 via the memblk 102. The parsefsm state machine 204 provides overall control for this process. It follows the tap controller state machine (not shown) via the tms signal 206 to initiate trace collection and then the details of the trace codes via the tdi signal 202. As the tdi bits appear, they are shifted through the right shifter 208 into the tdi shift register 210. The tb_addr register 212 is simultaneously updated so that it always points to the address of the next bit, i.e., bit address, to be shifted into the tdi shift register 210. The tb_addr register 212 indicates the address of a particular bit in RAM 16. When complete bytes are accumulated, they are extracted via the left shifter 214 into the mem_wr_bytes register 216. Correspondingly, the RAM byte address for the data is derived from the tb_addr register 212 and provided to the memblk 102.

The basic serial to parallel function of transferring the trace bit stream to the RAM 16 is not sufficient to construct a circular buffer of trace information. The tdiblk 104 handles setting the links to build a linked list of certain trace codes in RAM 16. It also handles the case of the RAM trace buffer being full, requiring a wrap back to the beginning. It performs compression on empty trace codes. It also operates with the trgblk 106 to control tracing in response to a trigger.

The Register Indirect Discontinuity (hereinafter referred to as regind) and Event Discontinuity (hereinafter referred to as evt) codes, as previously described, are linked together in a list to form the circular buffer of the present invention. Whenever a regind or evt code is detected by parsefsm 204, the bit address of that code is used to update the link field of the last regind/evt code. The address of this last regind/evt code is in the 1st_re_addr register 218. The bytes around and including this last regind/evt code are saved in the 1st_re_buffer register 220. Thus, when the next regind/evt code is observed, its bit address (in tb_addr 212) is ORed into the 1st_re_buffer 220 bits and sent to memory via memwrbytes 216 to be written at the address given by 1st_re_addr 218. At the same time, the bit address of the just-received regind/evt trace code is saved in the 1st_re_addr register 218. In addition, a placeholder link address field is shifted into the tdi shift register 210. The bytes surrounding and including the code, including the placeholder link field, are saved in the 1st_re_buffer 220. This process ensures that every regild/evt code in the completed trace includes the address of the next such code.

The tb_start register 222 holds the bit address of the start of the trace buffer in the RAM 16. Because of the way the linked list is maintained, tb_start 222 is always the address of a code with a regind/evt code and therefore includes a pointer to the next regind/evt code. When the trace buffer RAM 16 is completely filled, the tb_addr 212 value will be incremented past the tb_start 222 value. This is referred to as wrapping the trace buffer. When this condition is detected, the control logic causes the bytes in RAM 16 at tb_start to be read (via the memblk 102) and buffered in the tb_start register 222. When all the bytes have been read, the link field for that code is extracted using the left shifter 214 and the new address loaded into the tb_start register 222. In this way, the tb_start register 222 is updated to point to the next regind/evt code, thus freeing the trace buffer RAM 16 space between the old start and this new start to be written with new data.

The tdiblk 104 also compresses empty codes that appear in the incoming tdi bit stream 202 into an empty trace code followed by a count. In the tdi bit stream 202, a single 1 indicates an empty code. If the on-chip trace controller has long periods with no trace information generated, there will be long sequences of 1s in the bit stream. It is a waste of the finite RAM 16 trace buffer to store these 1s unmodified. Therefore, when parsefsm 204 recognizes an empty code, it begins counting the number of 1s using the emptycounter 230. The empty codes stored in the RAM 16 trace buffer are represented by a Huffman coded length. For example, if the number of 1s is less than or equal to 3, a 2-bit count of the number of 1s is shifted into the tdi shift register 210 via the right shifter 208. If the number of 1s is more than 3, but less than or equal to 255, an 8-bit count of the number of 1s is shifted into the tdi shift register 210 via the right shifter 208. These variable length counts are progressively shifted into the tdi shift register 210 until the end of the 1s sequence is observed.

The trace collection can be controlled by a trigger in cooperation with the trgblk 106. Triggers can be set on addresses that are contained in regind and evt codes. When parsefsm 204 recognizes such a code, it signals the trgblk 106 to collect the bit stream for the duration of the address. If trgblk 106 detects a match, i.e., the address component and trigger value are equal, it causes tdiblk 104 to take some action based on the control programmed for the trigger. Other possible relations may include logical relations or additional arithmetic relations. For example, the action may be to continue tracing for a certain number of clock cycles and then stop trace collection or execution, generate a trigger to a separate monitoring device, etc.

As described above with respect to FIGS. 1–3, the present invention implements two concurrent processes. One process parses the incoming serial bit stream, i.e., separates the stream into address components and code components, extracts discontinuity codes and writes these codes and additional information to the local memory. Thus, circular buffer controller 10 parses the serial bit stream, detects discontinuity codes, and writes transformed codes to RAM 16 trace buffer memory. This includes storing the Register Indirect and Event codes as they are observed and updating the link field of the last observed such code with the address of the just observed code.

The second process implements the circular buffering by monitoring the current trace buffer position and taking action when it matches the beginning of the buffer. This process operates by freeing the space at the beginning of the trace buffer and making it available for continued writing. The trace buffer is managed so that it always begins with either a Register Indirect or Event code. When a wrap of the trace buffer is detected, the link of the record at the beginning of the buffer is read and this address becomes the next start of the buffer. Thus, the space from the old buffer start to the new buffer start is now available for accepting newly recorded trace data. In this manner, RAM 16 is managed as a circular buffer of discontinuity codes, i.e., when the buffer fills up, the oldest data will be overwritten with the new data.

Figure 4A:
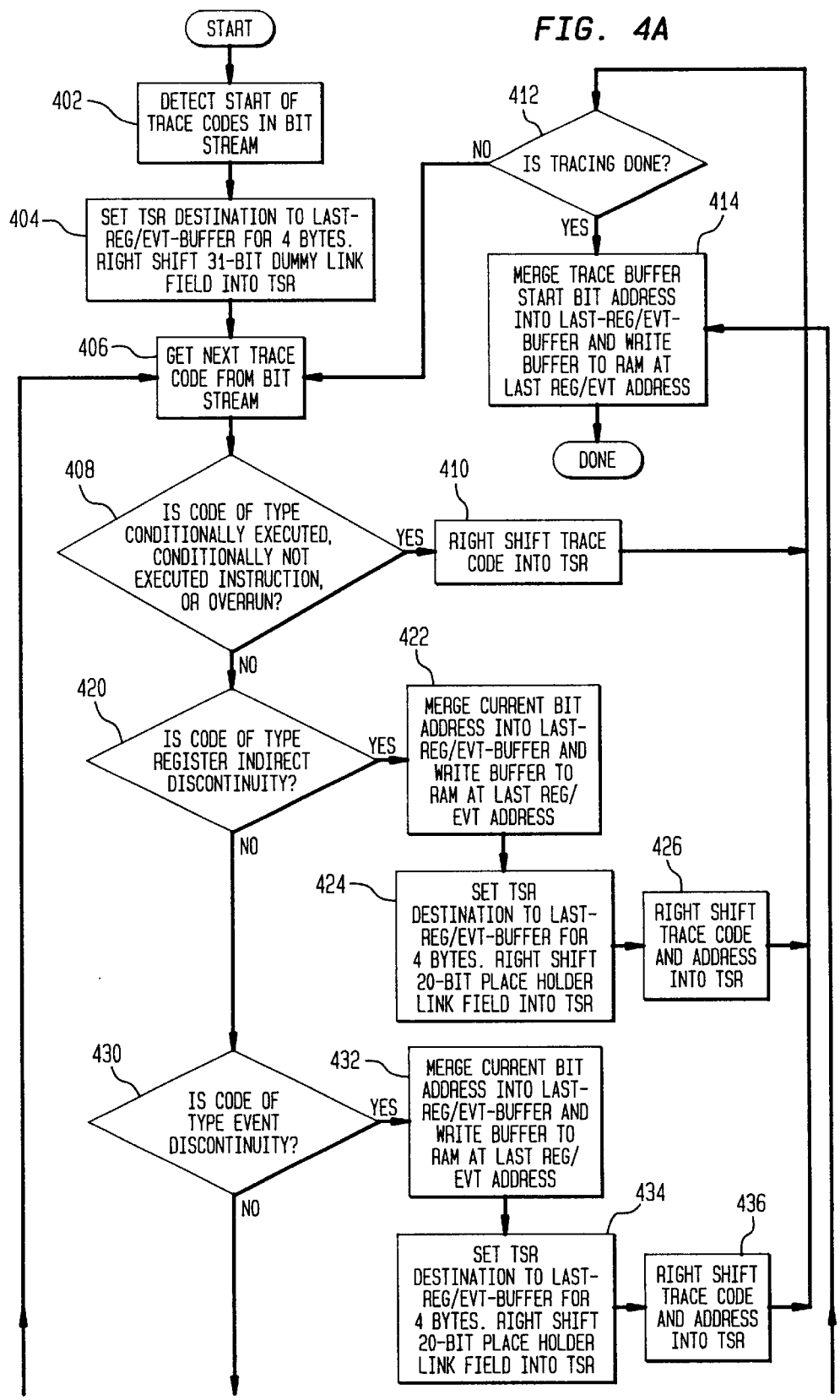
FIG. 4 illustrates in flow chart form the method for parsing the trace code.
Figure 4B:
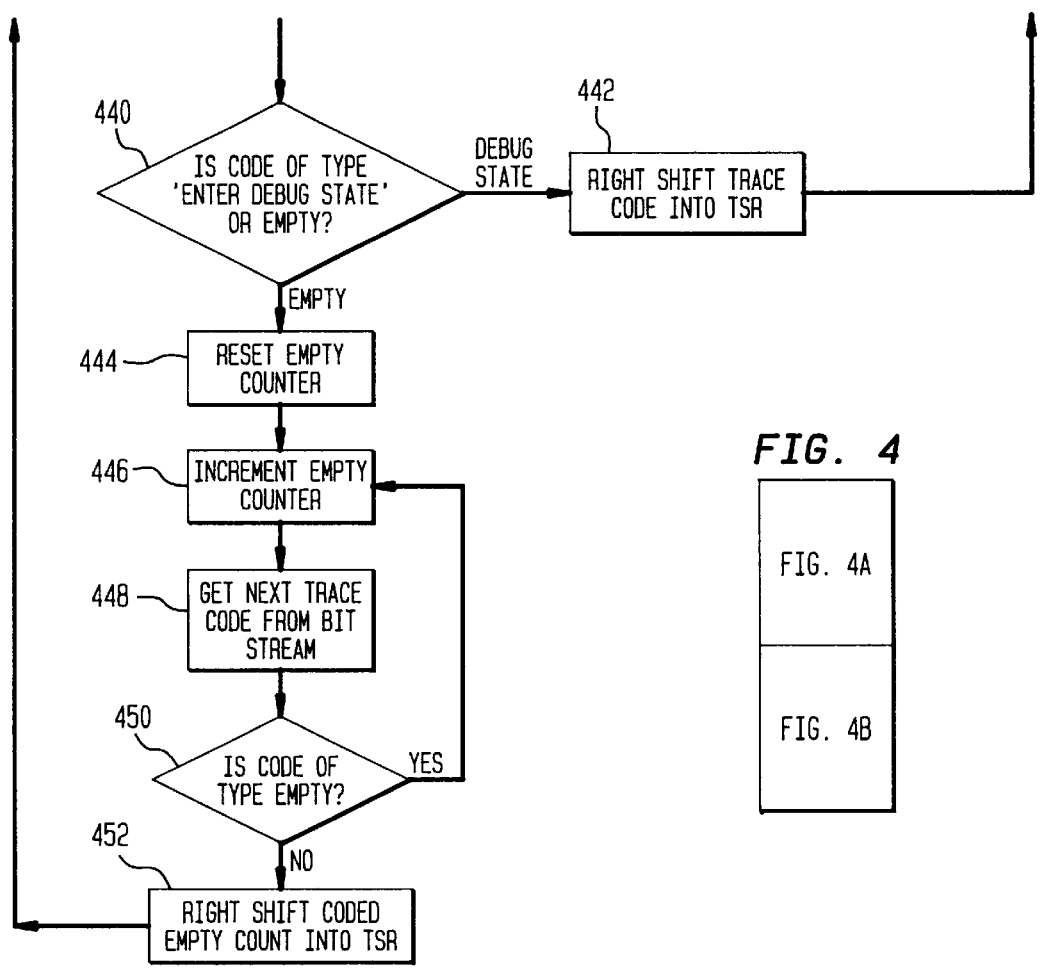

Referring now to FIG. 4, the first process of the present invention is illustrated in flow chart form. The parsing begins at step 402 with the detection of the start of the trace codes in the serial bit stream. For example, the JTAG interface is used to transfer trace data as well as many other types of data. Thus, some protocol is used to determine when the trace data first appears in a particular JTAG serial scan. For the CBC 10, this protocol is to follow the JTAG TAP controller state transitions that cause the on-chip debug logic to commence transfer of trace data out of the chip.

In CBC 10, the buffer that initially captures the processed trace data is referred to as the tdi shift register 210 (hereinafter referred to as TSR). The TSR 210 converts the serial format of the JTAG bit stream into a parallel format to write to the RAM 16. The data that enters the TSR 210 can be removed to one of two destinations: the last-reg/evt-buffer (1st_re_buffer) 220 or the RAM 16 trace buffer. The last-reg/evt-buffer 220 is the name of a register that holds the most recently observed register indirect or event trace code and a link placeholder field. The code's associated address is held by the last reg/evt address register (1st_re_addr register) 218. Bytes removed to the RAM 16 are written at the byte address corresponding to the bit address of the bytes removed. As whole bytes are accumulated into the TSR 210, they are removed asynchronously. In other words, independently of the operation of the parsefsm state machine 204, one or more bytes may be removed, in parallel, from the TSR 210 to either the last-reg/evt-buffer 220 or the RAM 16.

The first data entered into the TSR 210 after detection of trace code start is a 31-bit placeholder field. In step 404, this placeholder and following trace codes for the next 4 complete bytes are transferred to the last-reg/evt-buffer 220. This will become the link from the start of the trace to the first regind/evt trace code. In addition, a copy of the trace buffer start address is saved as the last regind/evt code address.

The next step 406 is to get the next trace code. This code is tested in step 408 to determine if it is a conditionally executed, conditionally not executed, or overrun type as previously described.

If the answer to step 408 is yes, i.e., the trace code is conditionally executed, conditionally not executed, or overrun, the code is simply shifted into the TSR 210 in step 410. Then in step 412 it is determined if tracing is done. If tracing is done (e.g. no more trace codes or some other indication), in step 414 the trace buffer start address is merged into the placeholder field in the last-reg/evt-buffer 220 and written to RAM 16 at the address of the last regind/evt code. Otherwise, the next trace code is collected and examined in step 406.

If the answer to step 408 is no, step 420 determines if the trace code is a register indirect discontinuity type. If the answer to step 420 is yes, the updating of a circular buffer link is required in addition to capturing this trace code. First, the bit address of this trace code is merged in step 422 into the placeholder field in the last-reg/evt- buffer 220. This data is then written to the RAM 16 at the byte address corresponding to the last regind/evt code bit address. A 20-bit placeholder field is shifted into the TSR 210 along with the register indirect trace code and its associated address in steps 424, 426. This data and following trace codes for the next 4 complete bytes are transferred to the newly emptied last-reg/evt-buffer 220. The placeholder field in this data will later be filled with a link from this code to the next regind/evt code. In addition, a copy of the bit address of this trace code is saved as the last regind/evt code address. Then if tracing is done in step 412 (e.g. no more trace codes or some other indication), the trace buffer start address is merged into the placeholder field in the last-reg/evt-buffer and written to RAM 16 at the address of the last regind/evt code in step 414. Otherwise, the next trace code is collected and examined in step 406.

If the answer to step 420 is no, it is next determined if the code is an event discontinuity type in step 430. If the trace code is of an event discontinuity, the updating of a circular buffer link is required in addition to capturing this trace code. First, the bit address of this trace code is merged in step 432 into the placeholder field in the last-reg/evt-buffer 220. This buffer is then written to the RAM 16 at the byte address corresponding to the last regind/evt code address bit address. A 20-bit placeholder field is shifted into the TSR 210 along with the event trace code and its associated address in steps 434, 436. This data and following trace codes for the next 4 complete bytes are transferred to the newly emptied last-reg/evt-buffer 220. The placeholder field in this data will later be filled with a link from this code to the next regind/evt code. In addition, a copy of the bit address of this trace code is saved as the last regind/evt code address. Then if tracing is done in step 412 (e.g. no more trace codes or some other indication), the trace buffer start address is merged into the placeholder field in the last-reg/ evt-buffer and written to RAM 16 at the address of the last regind/evt code in step 414. Otherwise, the next trace code is collected and examined in step 406.

If the answer to step 430 is no, it is determined if the code is an "enter debug state" or "empty" type as previously described in step 440. If the trace code is of type "enter debug state", the code is shifted into the TSR 210 in step 442. The presence of this code indicates that tracing is done and that the JTAG interface will now be used for non-trace data. Thus, the trace buffer start address is merged into the placeholder field in the last-reg/evt-buffer and written to RAM 16 at the address of the last regind/evt code.

If the trace code indicates that no trace information was available (i.e. empty), then a counter is reset in step 444 to begin tracking the duration of the string of empty codes. As each empty code is observed in step 448, the counter is incremented in step 446 depending upon whether the code is of type empty as determined in step 450. Depending on the empty count coding scheme, the empty count can either be entered into the TSR 210 in step 452 only after a non-empty trace code is observed or as certain thresholds of the count are exceeded until finally a non-empty code is detected. When a non-empty code is detected, it is examined as above.

In parallel with the first process of parsing by parsefsm 204 state machine, the second process of the present invention, i.e., the circular buffering, is controlled by a separate state machine called wrapfsm. Wrapping occurs when the current bit address is modified so that it passes the trace buffer start address. Recall that the current bit address is modified whenever new links, trace codes and/or associated address bits are shifted into the TSR 210. When this occurs, this means that the link address located in RAM 216 at the trace buffer start address is about to be overwritten with just received trace data. The method of controlling the circular buffering is illustrated in flow chart form in FIG. 5.

As trace codes are collected, the value in the trace buffer start register is compared with the current bit address in step 502. In step 504 it is determined if the current bit address has passed the trace buffer start address. If the current bit address passes the trace buffer start, then the state machine initiates a read of 4 bytes from the trace buffer RAM 16 in step 506. Passing implies that there was a change in the current bit address such that the addition of the number of bits shifted into the TSR 210 caused the current bit address to overflow or underflow relative to the size of the circular buffer while remaining less than or greater than the trace buffer start; or that the addition caused the current bit address to change from less than to greater than the trace buffer start or vice versa with no accompanying overflow or underflow.

Since the trace buffer start address is a bit address, the link pointed to by the trace buffer start address is not necessarily aligned on a byte boundary. Thus, the 4 bytes containing the link are read and loaded temporarily into the trace buffer start register 222. The link is then extracted from these 4 bytes in step 508 by left shifting the trace buffer start contents and the shifted value is loaded back into the trace buffer start register in step 510. Then the comparison begins again in step 502 to detect when the current bit address passes the new trace buffer start value. In addition, a status flag is set to indicate that the trace buffer wrapped.

The memory block assigns higher priority to reads than writes. This ensures that the read of the location pointed to by the trace buffer start contents on a wrap is performed before the bits that caused the wrap are written to the RAM 16. By maintaining RAM 16 as a circular buffer, the apparatus operates like a logic analyzer and collects an instruction trace up until a particular point in the code, i.e., the point in the code that is the trigger. Thus, the present invention provides a "trace until" capability. While the implementation of the invention shown with respect to FIGS. 1–3 is a hardware implementation, the invention is not so limited and may also be implemented by corresponding software capable of performing the method of the present invention.

Reference has been made to a preferred embodiment in describing the invention. However, additions, deletions, substitutions, or other modifications which would fall within the scope of the invention defined in the claims may be found by those skilled in the art and familiar with the disclosure of the invention. Any modifications coming within the spirit and scope of the following claims are to be considered part of the present invention.

What is claimed as new and desired to be protected by Letters Patent of the United States is:

1. A method for providing circular buffering of on-chip program tracing for a processing device comprising the steps of:

reading a bit stream output from said processing device, said bit stream comprising a plurality of types instructions executed by said processing device;

parsing each of said plurality of trace codes into an address component and a code component;

a generating a link component between a store address component of a trace code just read with a previously read trace code, said link component being a value representing an address of a location in a memory and further comprising;

setting said link component to a first value;

replacing said first value of said link component of a previous transformed code with a value representing an address location of said memory where said code component, address component, and link component of a just read trace code are store; and storing said code component, said address component, and said link component generated for said trace code just read in a buffer;

storing said code component of a said trace code in said memory if said trace code is of a first type;

storing said code component, said address component and said link component as a transformed code in said memory if said trace code is of a second type, wherein said second type code is a discontinuity type instruction;

maintaining said memory as a circular buffer using said link component to modify a previously stored transformed code with said link component; and comparing a value representing a staring address of said memory with a value representing a current address, said current address being associated with an area in said memory for storing a next read transformed code.

2. The method according to claim 1, wherein if said value representing said current address has passed said value representing said starting address, said method further comprises:

reading said link component stored in said memory corresponding to said starting address;

extracting said link component; and using said extracted link component as a new start address of said memory.

3. The method according to claim 2 further comprising the steps of:

outputting said code components and said transformed codes stored in said memory; and using said output from said memory to construct a program trace representative of said plurality of types of instructions executed by said processing device.

4. The method according to claim 3, further comprising the step of:

using said program trace to diagnose said processing device.

5. An integrated circuit a comprising;

a digital processor including an output port, said digital processor executing a plurality of types of instructions input to said digital processor;

a circular buffer controller, said circular buffer controller connected to said digital processor to receive a bit stream output from said output port of said digital processor, said bit stream comprising a plurality of trace codes, each of said plurality of trace codes being representing of one of said plurality of types instructions executed by said digital processor, said circular buffer controller parsing said plurality of trace codes into an address component and a code component and generating a link component between a stored address component of a trace code just read with a previously read trace code; and a memory, said memory being used to store trace codes extracted by said circular buffer controller, wherein said memory fills, said circular buffer controller over writes an oldest location said memory, wherein when said memory fills, said circular buffer controller overwrites an oldest trace code previously extracted with a trace code most recently extracted by maintaining a link between an address of a previously extracted trace code and an address of said most recently extracted trace code;

wherein said circular buffer controller stores said code component of said trace code in said memory location if said trace code is of a first type, and stores said code component, said address component and said link component as a transformed code in said memory location if said trace code is of a second type;

wherein said circular buffer controller further comprises:

a first register, said first register storing an address of a previous transformed code; and a first buffer, said first buffer storing bytes around and including said previous transformed code, wherein when a successive trace code is read, an address of said successive trace code replaces said link component of said previous transformed code in said first buffer.

6. The integrated circuit according to claim 5, wherein information stored in said first buffer is written to said memory at an address specified by said first register.

7. The integrated circuit according to claim 6, wherein said circular buffer controller further comprises:

a second register, said second register storing a start address of said memory; and a third register, said third register storing said address of said successive trace code, wherein when a value representing said address stored in said third register passes a value representing said address stored in said second register, said second register is updated to store said link component of said transformed code stored in said starting address.

8. The integrated circuit according to claim 7, wherein said circular buffer controller further comprises:

a counter, said counter storing a value representing codes read by said circular buffer controller that have no trace information, wherein said circular buffer controller compresses said codes that have no trace information for storing in said memory.

* * * * *